United States Patent [19]

Slaughter

[11] 4,272,155
[45] Jun. 9, 1981

[54] OPTICAL CABLES

[75] Inventor: Raymond J. Slaughter, Chiselhurst, England

[73] Assignee: BICC Limited, London, England

[21] Appl. No.: 969,021

[22] Filed: Dec. 14, 1978

[30] Foreign Application Priority Data

Dec. 21, 1977 [GB] United Kingdom ............... 53166/77

[51] Int. Cl.³ .................................................. G02B 5/16
[52] U.S. Cl. .................................................. 350/96.23
[58] Field of Search .................................... 350/96.23

[56] References Cited

U.S. PATENT DOCUMENTS

| 4,078,853 | 3/1978 | Kempf et al. ............... 350/96.23 |
| 4,110,001 | 8/1978 | Olszewski et al. ........... 350/96.23 |

FOREIGN PATENT DOCUMENTS

| 2815514 | 10/1978 | Fed. Rep. of Germany ........ 350/96.23 |
| 2294460 | 7/1976 | France ................... 350/96.23 |
| 1425928 | 2/1976 | United Kingdom ................ 350/96.23 |
| 1479427 | 7/1977 | United Kingdom ................ 350/96.23 |

*Primary Examiner*—Stewart J. Levy
*Attorney, Agent, or Firm*—Buell, Blenko, Ziesenheim & Beck

[57] ABSTRACT

An optical cable comprises a plurality of separately formed flexible tubes in at least one of which is loosely housed at least one flexible tape which, viewed in transverse cross-section, is corrugated so that it has a plurality of troughs extending along its length, at least two optical bundles and/or separate optical fibres being secured in some of the troughs. An outer protective sheath surrounds the plurality of tubes and at least one elongate reinforcing member is embedded in or surrounded by the sheath.

15 Claims, 5 Drawing Figures

OPTICAL CABLES

This invention relates to optical cables for the transmission of the ultraviolet, visible and infra-red regions of the electromagnetic spectrum, which regions, for convenience, will hereinafter all be included in the generic term "light", and especially, but not exclusively, to optical cables for use in the communication field adapted for transmission of light having a wavelength within the range 0.8 to 1.3 micrometers.

For the purpose of transmitting light in an optical transmission system it has been proposed to employ optical guides in the form of cables including one or more than one optical fibre. Each optical fibre is usually of substantially circular cross-section but, in some circumstances, it may be of non-circular cross-section.

Optical cables with which the invention is concerned include cables comprising one or more than one optical fibre of glass or other transparent material whose refractive index is arranged to decrease over at least a part of the radius of the fibre in a direction towards the outer surface of the fibre and cables including one or more than one optical fibre of composite form comprising a core of transparent material clad throughout its length with another transparent material of lower refractive index which, by total internal reflection of light being transmitted along the fibre, confines at least a major proportion of the light within the core. A composite optical fibre is generally, but not necessarily, made up of two glasses of different refractive indices, the glass forming the core having a higher refractive index than the glass forming the cladding; the refractive index of the glass of the core may gradually decrease in a direction towards the outer surface of the core over at least a part of the distance between the central axis of the core and its outer surface. In an alternative form of composite fibre the core may be made of a transparent liquid having a higher refractive index than that of the cladding.

According to the present invention an improved optical cable comprises a plurality of separately formed tubes of rubber or plastics material in at least one, and preferably in each, of which is loosely housed at least one flexible tape which, viewed in transverse cross-section, is corrugated so that it has a plurality of troughs extending along its length, at least two optical bundles and/or separate optical fibres secured in some of the troughs; an outer protective sheath surrounding the plurality of tubes; and, embedded in or surrounded by the outer protective sheath, at least one elongate reinforcing member.

The or each elongate reinforcing member is of such a material and of such a cross-sectional area having regard to the material or materials and cross-sectional area of the optical bundles and/or of the separate optical fibres that the strain otherwise imparted to each optical fibre when the cable is stressed in such a way as to tend to subject any optical fibre to a tensile force is eliminated or reduced at least to a substantial extent by the reinforcing member or members.

By the expression "optical bundle" as used in the specification and claims of the aforesaid patent is meant a group of optical fibres or a group of fibres including at least one optical fibre and at least one non-optical reinforcing fibre or other reinforcing elongate member. Each optical fibre of the optical bundle may be used independently as a separate light guide, each with its own modulated light source and detector, or a plurality of optical fibres of a bundle may be used together as a single light guide, with a single light source.

Since the flexible tape in whose corrugations the or each optical bundle and/or separate optical fibre is secured is housed loosely in a tube, limited relative movement between the flexible tape and the tube—and hence between the or each optical bundle and/or the or each separate optical fibre and the tube—can take place when the cable is flexed.

The tubes themselves may be loosely housed in the sheath thereby permitting limited relative movement between the tubes and between the tubes and the sheath when the optical cable is flexed.

By virtue of the fact that, in any particular tube, the position of each optical bundle and/or each separate optical fibre secured in a corrugation of the flexible tape with respect to the other optical bundle or bundles and/or other separate optical fibre or fibres is constant throughout the length of the cable, any optical bundle and/or separate optical fibre in the tube can be readily identified at any transverse cross-section of the cable. Furthermore, since each optical bundle and/or each separate optical fibre is secured on a flexible tape, feeding of the optical bundles and/or optical fibres into the bore of a tube during manufacture of the tube, and especially when initially introducing the optical bundles and/or optical fibres into the bore of the tube, is facilitated.

To provide for identification of any particular tube, each tube may be of a colour that is different from that of each of the other tubes. Where the tubes are arranged helically in one or more than one layer around a central reinforcing member, one tube only of the or each layer may be of a colour different from that of the other tubes of the layer to provide a datum for identification of any tube in the layer.

Tubes in the or each layer laid-up around a central reinforcing member preferably have an angle of lay lying in the range 5° to 15°. Where the tubes are arranged in two or more layers, the directions of lay in adjacent layers are preferably of the same hand.

Preferably, the or each flexible tape is of paper or plastics material, of glass or of metal or metal alloy. In some circumstances, it is preferred that the or each tape is of a material having a coefficient of thermal expansion approximating to or not too different from that of the material or materials of the optical fibres. For example, where the optical fibres are of a silica-based material, the or each tape may be of steel.

The optical bundles and/or separate optical fibres may be sandwiched between two tapes one overlying the other, one or each of these two tapes being transversely corrugated as described above. The two tapes may be so bonded together that the optical bundles and/or separate optical fibres are so housed within the troughs that they are capable of limited movement within the troughs in which they lie.

As a means of initially identifying any optical bundle and/or separate optical cable secured in the corrugations of at least one flexible corrugated tape, the support member may carry a longitudinally extending datum mark on its surface and/or at least one of the optical bundles.

In all cases, the length of the or each flexible tape may be greater than that of the tube in which it is loosely housed but, preferably, the or each flexible tape and the tube in which it is loosely housed are of equal or approximately equal lengths.

As previously indicated, the tubes may be loosely housed in the sheath, but where the tubes are arranged helically in one or more than one layer around a central reinforcing member they may be so secured to the reinforcing member by at least one helically lapped tape or thread that relative movement in a lengthwise direction between the tubes and the reinforcing member is substantially prevented and, in this case, the reinforcing member may also be of such a material and of such a cross-sectional area that it is highly resistant to axial compression.

Since the tubes are so secured to the central member that relative lengthwise movement between the tubes and the central member is substantially prevented, the tubes are protected against any axial compressive force to which the optical cable may be subjected whilst it is being installed or whilst it is in service with the result that such an axial compressive force will not cause buckling of an optical bundle and/or optical fibre and hence an increase in attenuation. Furthermore, since the tubes are protected against the effects of both axial compression and tensile forces, the optical cable is especially suitable for use in an environment in which the cable is likely to be subjected to a wide range of temperatures, e.g. −40° C. to 80° C., which would otherwise cause thermal contraction or thermal stretching of the tubes and hence possible damage to the optical bundle or bundles and/or separate optical fibre or fibres.

The invention is further illustrated by a description, by way of example, of two forms of optical cable and of three alternative forms of optical fibre element for use in an optical cable according to the invention with refererence to the accompanying drawing, in which.

Figure 1:
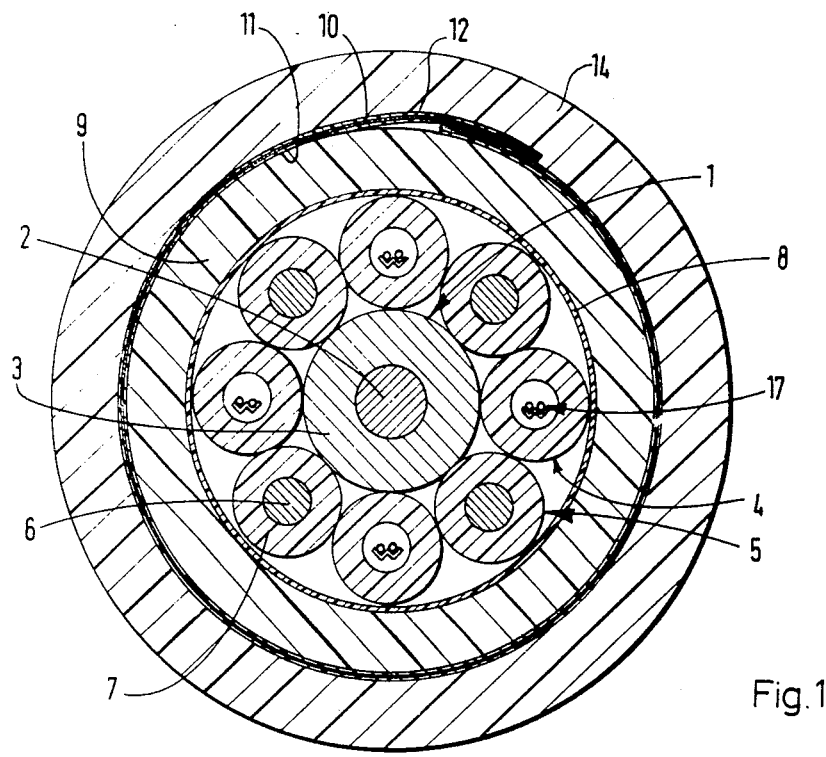
FIG. 1 is a transverse cross-sectional view of the optical cable drawn on an enlarged scale.

Referring to FIG. 1, the optical cable comprises a central reinforcing member 1 of overall diameter 2.4 mm around which is helically laid four plastics tubes 4, each loosely housing an optical fibre element 17, and four insulated conductors 5, the tubes and insulated conductors alternating around the layer. The central reinforcing member 1 comprises a steel wire 2 of diameter 1.8 mm having a plastics covering 3 of radial thickness 0.3 mm. Each tube 4 has an inner diameter of 0.9 mm and an outer diameter of 1.5 mm and each optical fibre element 17 loosely housed in a tube comprises a plastics tape which, viewed in transverse cross-section, is so corrugated that it has a plurality of troughs extending along its length in each of which an optical fibre is secured by adhesive. Each insulated conductor 5 comprises a copper conductor 6 of diameter 0.9 mm enclosed in an insulating covering layer 7 of polyethylene having a radial thickness 0.3 mm.

The assembly of tubes 4 and insulated conductors 5 is secured to the central reinforcing member 1 by a helically lapped plastics binder tape 8. An inner plastics sheath 9 having an outer diameter of 8.5 mm overlies the tape 8. Longitudinally applied to and transversely folded around the inner sheath 9 is an aluminium tape 10 having on its inwardly facing surface a layer 11 of plastics material which is bonded to the material of the inner sheath and having on its outwardly facing surface a layer 12 of plastics material which is bonded to the material of an outer plastics sheath 14. The plastics coated aluminium tape constitutes a moisture barrier. The optical cable has an overall diameter of 13 mm.

Figure 2:
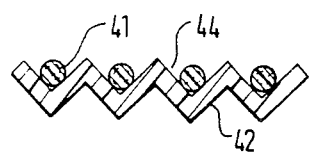
FIGS. 2 to 4 are transverse cross-sectional views of the three forms of optical fibre element drawn on a greatly enlarged scale.
Figure 3:
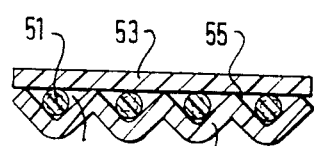
Figure 4:
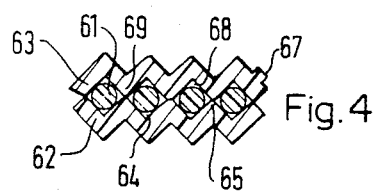

Instead of the optical fibre element 17 loosely housed in the bore of each plastics tube 4, either of the optical fibre elements shown in FIGS. 3 to 4 may be employed, the optical fibre elements being drawn on a greatly enlarged scale to clarify their structure. The optical fibre element shown in FIG. 2 comprises a flexible plastics tape 42 which, viewed in transverse cross-section, is so corrugated that it has a plurality of troughs 44 extending along its length in each of which an optical fibre 41 is secured by adhesive. The optical fibre element shown in FIG. 3 comprises a corrugated flexible plastics tape 52 which has a plurality of troughs 54 extending along its length, the troughs being closed by a flat plastics tape 53 which is bonded to the peaks 55. Optical fibres 51 are secured by adhesive in the troughs 54. In the optical fibre element shown in FIG. 4, optical fibres 61 are sandwiched between, and secured by adhesive in the troughs 64, 68 of, two flexible corrugated plastics tapes 62, 63 whose peaks 65, 69 are secured together by adhesive. To provide for ready identification of any optical fibre 61, the tape 63 has a longitudinally extending rib 67.

Figure 5:
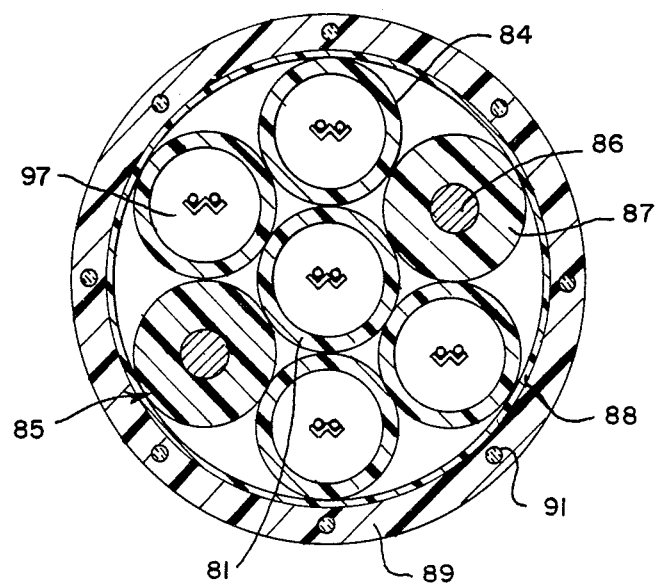
FIG. 5 is a transverse cross-sectional view of the second preferred form of optical cable drawn on an enlarged scale.

Referring to FIG. 5, the second preferred form of optical cable comprises a central plastics tube 81 around which are helically laid four plastics tubes 84, the plastics tubes 81 and 84 each loosely housing an optical fibre element 97, and two insulated conductors 85. Each optical fibre element 97 comprises a plastics tape to one surface of which two optical fibres are secured by an adhesive. Each insulated conductor 85 comprises a copper conductor 86 enclosed in an insulating covering 87 of polyethylene. The assembly of tubes 81 and 84 and insulated conductors 85 are secured together by a helically lapped plastics binder tape 88. A plastics sheath 89 surrounds the bound assembly of tubes 81 and 84 and insulated conductors 85 and, embedded in the sheath at circumferentially spaced positions, are elongate reinforcing members 91.

What I claim as my invention is:

1. An optical cable, comprising a plurality of separately formed flexible tubes in at least one of which is loosely housed at least one flexible tape which viewed in transverse cross-section, is corrugated so that it has a plurality of troughs extending along its length, at least two optical guides each comprising at least one optical fibre secured in each of at least some of said troughs an outer protective sheath surrounding the assembly of tubes, and, embedded in or surrounded by the outer protective sheath, at least one elongate reenforcing member.

2. An optical cable as claimed in claim 1, wherein the or each tape is of a metal or metal alloy.

3. An optical cable as claimed in claim 1, wherein each tube is of a colour that is different from that of each of the other tubes.

4. An optical cable as claimed in claim 1, wherein the or each flexible tape and the tube in which it is loosely housed are of approximately equal lengths.

5. An optical cable as claimed in claim 1, wherein at least one insulated electric conductor is assembled with the tubes.

6. An optical cable as claimed in claim 1, wherein the tape is of a material having a coefficient of thermal expansion approximating to that of the materials of the optical guides secured to the tape.

7. An optical cable as claimed in claim 6, wherein the optical fibres of the optical guides are of a silica-based material and the tape is of steel.

8. An optical cable as claimed in claim 1, wherein the tubes are arranged helically in at least one layer around a central elongate reinforcing member.

9. An optical cable as claimed in claim 8, wherein the tubes are helically laid up in at least two layers, the directions of lay in adjacent layers being of the same hand.

10. An optical cable as claimed in claim 8, wherein one tube only of the or each layer is of a colour different from that of the other tubes of the layer to provide a datum for identification of any tube in the layer.

11. An optical cable as claimed in claim 8, wherein the tubes are so secured to the central elongate reinforcing member by at least one helically lapped flexible elongate element that relative movement in a lengthwise direction between the tubes and the reinforcing member is substantially prevented, the reinforcing member being of such a material and of such a cross-sectional area that it is highly resistant to axial compression.

12. An optical cable comprising a plurality of separately formed flexible tubes in at least one of which is loosely housed at least one pair of flexible tapes one overlying the other, at least one of which tapes, viewed in transverse is corrugated so that it has a plurality of troughs extending along its length, at least two optical guides each comprising at least one optical fibre secured in each of at least some of said troughs an outer protective sheath surrounding the assembly of tubes, and, embedded in or surrounded by the outer protective sheath, at least one elongate reenforcing member.

13. An optical cable comprising a plurality of separately formed flexible tubes in at least one of which is loosely housed at least one pair of overlying flexible tapes which are bonded together, at least one of which tapes, viewed in transverse cross-section, being so corrugated that it has a plurality of troughs extending along its length at least two optical guides each comprising at least one optical fibre and so housed in at least some of the troughs that they are capable of limited movement within the troughs in which they lie, an outer protective sheath surrounding the assembly of tubes, and, embedded in or surrounded by the outer protective sheath, at least one elongate reenforcing member.

14. An optical cable as claimed in claim 1 or 13, wherein the or each tape is of paper or plastics material.

15. An optical cable as claimed in claim 1 or 13, wherein the flexible tape or at least one of the flexible tapes carries a longitudinally extending datum mark.

* * * * *

UNITED STATES PATENT AND TRADEMARK OFFICE
CERTIFICATE OF CORRECTION

PATENT NO. : 4,272,155
DATED : June 9, 1981
INVENTOR(S) : RAYMOND J. SLAUGHTER

It is certified that error appears in the above–identified patent and that said Letters Patent are hereby corrected as shown below:

Column 3, line 32, after "two" --preferred--should be inserted.

Signed and Sealed this

Twenty-second Day of September 1981

[SEAL]

Attest:

GERALD J. MOSSINGHOFF

Attesting Officer — Commissioner of Patents and Trademarks